(12) United States Patent
Chisholm et al.

(10) Patent No.: US 12,528,614 B2
(45) Date of Patent: Jan. 20, 2026

(54) COOLING SEALED PACKAGES AFTER HOT FILING AND SEALING

(71) Applicant: Owens-Brockway Glass Container Inc., Perrysburg, OH (US)

(72) Inventors: Brian J. Chisholm, Sylvania, OH (US); Brian J. Brozell, Maumee, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 0 days.

(21) Appl. No.: 17/529,372

(22) Filed: Nov. 18, 2021

(65) Prior Publication Data

US 2022/0073225 A1    Mar. 10, 2022

Related U.S. Application Data

(63) Continuation of application No. 16/269,342, filed on Feb. 6, 2019, now Pat. No. 11,273,940.

(51) Int. Cl.
*B29C 65/02* (2006.01)
*B29C 65/00* (2006.01)
(Continued)

(52) U.S. Cl.
CPC .......... *B65B 51/32* (2013.01); *B29C 66/0342* (2013.01); *B65B 35/58* (2013.01); *B65B 51/10* (2013.01); *B29C 65/02* (2013.01)

(58) Field of Classification Search
CPC ......... B65B 51/32; B65B 35/56; B65B 35/58; B65B 7/2878; B65G 47/26
(Continued)

(56) References Cited

U.S. PATENT DOCUMENTS 1,268,786 A  *  6/1918  Ball ..................... F24V 30/00
                                                    53/436
3,269,080 A      8/1966  Howe, Jr.
(Continued)

FOREIGN PATENT DOCUMENTS

AR        247518 A1    1/1995
AR        027343 A1    3/2003
(Continued)

OTHER PUBLICATIONS

Chile Informe Pericial (Expert Report), Chile Serial No. 202102083, Applicant: Owens-Brockway Glass Container Inc., Mail Date: Sep. 15, 2022.
(Continued)

*Primary Examiner* — Joshua G Kotis
*Assistant Examiner* — Patrick B Fry

(57) ABSTRACT

A method of sealing a foil liner to a hot-filled container includes the steps of aligning a liner engagement surface of a seal head with a liner sealing surface of the container when the container is in a first position, wherein at least a peripheral margin of the foil liner is disposed between the liner engagement and sealing surfaces of the seal head and the container, respectively; applying heat between the seal head and the container to heat and attach the foil liner and the sealing surface of the container, resulting in a sealed package; rotating the sealed package from the first position to a second position; and applying fluid onto at least a portion of the sealed package to cool a head space of the sealed package. The head space is disposed between an inner surface of the container and a product packaged in the sealed package.

23 Claims, 1 Drawing Sheet

(51) Int. Cl.
  *B65B 7/28* (2006.01)
  *B65B 35/56* (2006.01)
  *B65B 35/58* (2006.01)
  *B65B 51/10* (2006.01)
  *B65B 51/32* (2006.01)
  *B65G 47/26* (2006.01)

(58) Field of Classification Search
  USPC ........ 53/387.4, 440, 127, 376.6, 377.7, 471, 53/329.2
  See application file for complete search history.

(56) References Cited

U.S. PATENT DOCUMENTS

| | | | |
|---|---|---|---|
| 3,660,205 A | | 5/1972 | Taylor |
| 3,930,041 A | | 12/1975 | Komatsu et al. |
| 4,024,694 A | * | 5/1977 | Cooper ................ B65D 85/816 |
| | | | 53/131.3 |
| 4,156,741 A | | 5/1979 | Beauvais et al. |
| 4,394,917 A | | 7/1983 | Looser |
| 5,032,213 A | | 7/1991 | Thomas, Jr. |
| 5,494,691 A | * | 2/1996 | Sizer ....................... B65B 55/14 |
| | | | 426/399 |
| 5,495,705 A | | 3/1996 | Miura et al. |
| 5,715,654 A | | 2/1998 | Taylor et al. |
| 7,361,275 B2 | * | 4/2008 | Wien ..................... A23L 5/273 |
| | | | 210/764 |
| 7,464,559 B2 | | 12/2008 | Chu et al. |
| 9,133,006 B2 | | 9/2015 | Kelley |
| 10,287,039 B2 | * | 5/2019 | Heyn ..................... B65B 51/227 |
| 10,343,797 B2 | * | 7/2019 | Brozell ................. B65B 7/164 |
| 10,703,617 B2 | * | 7/2020 | Melrose ................ B65B 31/046 |
| 11,273,940 B2 | * | 3/2022 | Chisholm ............. B65B 7/164 |
| 2001/0014366 A1 | | 8/2001 | Hammond |
| 2003/0110736 A1 | * | 6/2003 | Boyd ....................... B65B 3/18 |
| | | | 53/485 |
| 2003/0152297 A1 | | 8/2003 | Yasuhira |
| 2004/0119198 A1 | | 6/2004 | Alper et al. |
| 2004/0139701 A1 | | 7/2004 | Cady et al. |
| 2004/0222224 A1 | | 11/2004 | Plester |
| 2005/0155323 A1 | | 7/2005 | Abercrombie, III et al. |
| 2005/0155325 A1 | * | 7/2005 | Abercrombie ........ B65B 31/006 |
| | | | 53/485 |
| 2005/0247960 A1 | | 11/2005 | Rim et al. |
| 2007/0184157 A1 | | 8/2007 | Stegmaier |
| 2007/0298196 A1 | | 12/2007 | Petersen et al. |
| 2009/0065507 A1 | | 3/2009 | Ishihara et al. |
| 2009/0071103 A1 | | 3/2009 | Anderson |
| 2009/0320415 A1 | | 12/2009 | Senbon et al. |
| 2010/0107568 A1 | | 5/2010 | Inaba et al. |
| 2010/0170867 A1 | | 7/2010 | Hayakawa |
| 2010/0186352 A1 | | 7/2010 | Thomasset et al. |
| 2010/0218460 A1 | * | 9/2010 | Le Goff-Larroche ....................... |
| | | | B65B 55/10 |
| | | | 53/425 |
| 2011/0154785 A1 | | 6/2011 | Stolte |
| 2012/0175276 A1 | | 7/2012 | Melrose |
| 2012/0261295 A1 | | 10/2012 | Wolters et al. |
| 2012/0318002 A1 | | 12/2012 | Ueda et al. |
| 2012/0324836 A1 | * | 12/2012 | Miller ..................... B65B 51/18 |
| | | | 53/478 |
| 2013/0236617 A1 | | 9/2013 | Mycock et al. |
| 2015/0128531 A1 | | 5/2015 | Auburger et al. |
| 2015/0375884 A1 | * | 12/2015 | Kelley ..................... B67C 7/00 |
| | | | 53/127 |
| 2016/0016681 A1 | * | 1/2016 | Heyn ..................... B65D 41/18 |
| | | | 53/471 |
| 2016/0264270 A1 | * | 9/2016 | Brozell ................. B65B 7/2878 |
| 2017/0008745 A1 | * | 1/2017 | Melrose ................ B65B 31/046 |
| 2018/0178938 A1 | | 6/2018 | Zhao et al. |
| 2020/0087131 A1 | * | 3/2020 | Melrose ..................... B67C 7/00 |

FOREIGN PATENT DOCUMENTS

| | | |
|---|---|---|
| CA | 3065493 A1 | 12/2018 |
| CN | 103579207 A | 2/2014 |
| EP | 0343364 A2 | 11/1989 |
| JP | H0995311 A | 4/1997 |
| JP | H10264975 A | 10/1998 |
| MX | 06005142 A | 1/2007 |
| WO | 9702139 A1 | 1/1997 |
| WO | 2005070814 A1 | 8/2005 |
| WO | 2018222055 A1 | 12/2018 |

OTHER PUBLICATIONS

Chile Informe de Buequeda (Search Report), Chile Serial No. 202102083, Applicant: Owens-Brockway Glass Container Inc., Mail Date: Sep. 15, 2022.
EP Office Action, EP Application No. 20709072.1-1014, Applicant: Owens-Brockway Glass Container Inc., Date: Dec. 14, 2022.
PCT Search Report and Written Opinion, Int. Serial No. PCT/US2020/016709, Int. Filing Date: Feb. 5, 2020, Applicant: Owens-Brockway Glass Container Inc., Mail Date: Jun. 18, 2020.
Colombian Office Action w/English Translation, Serial No. NC2021/0010372, Applicant: Owens-Brockway Glass Container Inc., Date: Apr. 4, 2022.
Colombia Office Action with English Translation, Int. Application No. NC2023/0004176, Applicant: Owens-Brockway Glass Container Inc., Dated: Apr. 21, 2023.
Argentina Office Action with English Translation, Official Patent No .; P200100331, Applicant: Owens-Brockway Glass Container Inc., Dated: Mar. 22, 2023.
Argentina Office Action, Application No. P200100331, Applicant: Owens-Brockway Glass Container Inc., Date: Sep. 18, 2023.
Colombian Office Action, Serial No. NC2023/0004176, Applicant: Owens-Brockway Glass Container Inc, Dated: Aug. 28, 2023.
Canadian Office Action, CA Application No. 3,128,240, Owner: Owens-Brockway Glass Container Inc., Dated: Mar. 14, 2024.

* cited by examiner

COOLING SEALED PACKAGES AFTER HOT FILING AND SEALING

TECHNICAL FIELD

This patent application discloses devices and methods to transport products, more particularly, to package those products.

BACKGROUND

During packaging of products (e.g., food) into containers, the products are often heated prior to packaging so that hot products are deposited into the containers, in a "hot-filling" process. After hot-filling, a closure or a foil liner can be applied to an opening of the containers to seal the containers, producing a sealed package. Heat is often used to bond the foil liner to the container, for example, a glass container having a relatively rigid structure in contrast to the relatively flexible foil liner.

In some cases, after sealing, the sealed packages are immediately inverted so that the hot products contact inner surfaces of the foil liners and sterilize the inner surfaces and the inside surfaces of the containers so that the entire inside surface of the sealed package is sterilized. However, this sterilization method often weakens the bond between the foil liners and the containers, and can cause deformation, stretching, wrinkling, doming, and/or tears in the foil liners. Even if the products are somewhat cooled prior to inverting, the inverting process can shake up and/or reheat the products, leading to defects in the foil liners and/or the bonds to the containers.

BRIEF SUMMARY OF THE DISCLOSURE

The present disclosure embodies a number of aspects that can be implemented separately from or in combination with each other.

In accordance with one aspect of the disclosure, there is provided a method of sealing a foil liner to a hot-filled container, including the steps of aligning a liner engagement surface of a seal head with a liner sealing surface of the container when the container is in a first position, wherein at least a peripheral margin of the foil liner is disposed between the liner engagement and sealing surfaces of the seal head and the container, respectively; applying heat between the seal head and the container to heat and attach the foil liner and the sealing surface of the container to produce a sealed package; rotating the sealed package from the first position to a second position; and applying fluid onto at least a portion of the exterior of the sealed package to cool the air in the package; such air being the head space of the sealed package that is disposed between an inner surface of the container and a product packaged in the sealed package.

In accordance with another aspect of the disclosure, there is provided a method of sealing a foil liner to a hot-filled container, including the steps of aligning a liner engagement surface of a seal head with a liner sealing surface of the container when the container is in a first position, wherein at least a peripheral margin of the foil liner is disposed between the liner engagement and sealing surfaces of the seal head and the container, respectively; applying heat between the seal head and the container to heat and attach the foil liner and the liner sealing surface of the container to produce a sealed package; separating the seal head from the container; applying fluid to the foil liner to cool the foil liner and the air head space of the sealed package that is located between the foil liner and a product packaged in the sealed package; inverting the sealed package from the first position to a second position; applying the fluid onto at least a portion of the sealed package to cool the air head space of the sealed package that is disposed between an inner surface of the container and the product packaged in the sealed package; inverting the sealed package from the second position to the first position; and applying the fluid to the foil liner to cool the foil liner and the head space of the sealed package that is between the foil liner and the product packaged in the sealed package.

In accordance with another aspect of the disclosure, there is provided a method of cooling a hot-filled, sealed package, including a foil liner sealed to a container. The method includes the steps of (a) applying a cooling fluid to the foil liner; (b) inverting the sealed package from a first position to a second position; (c) applying the cooling fluid to the sealed package; (d) inverting the sealed package from the second position to the first position; and (e) applying the cooling fluid to the liner.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION

A general object of the present disclosure, in accordance with one aspect thereof, is to provide a method of sealing a foil liner to a hot-filled container to produce a sealed package that maintains an intact foil liner, or an effective bond between the foil liner and the container, even if heated contents of the sealed package contact or heat up portions of the foil liner or the head space inside the sealed package.

Containers often include a base, a top surface, and a body extending therebetween. As discussed briefly in the background, the top surface, in turn, includes a sealing surface to which a removable foil liner may be secured and sealed in order to seal the container, providing a sealed package. One technique or process that may be used to secure and seal the foil liner to the sealing surface of the container is a conduction sealing process. In such a process, the foil liner and the sealing surface are heated by a seal head to create an acceptable bond therebetween. Another technique or process that may be used is an induction sealing process. In such a process, the foil liner and the sealing surface are heated as a result of an electromagnetic field that is generated by an induction coil in the seal head, and the acceptable bond is formed between the foil liner and sealing surface of the container as a result of the heating therebetween. Illustrative seal heads and related sealing processes are disclosed in U.S. patent application Ser. No. 14/645,531, which is assigned to the assignee hereof and is incorporated herein by reference.

During such processes, however, the generated heat and/or the heat from a hot-filled product within the sealed package may cause a head space of the sealed package (i.e., the air or gas volume between the contents of the container and the foil liner) to expand and/or the pressure therein to increase, thereby possibly stretching the foil liner causing it to tear or deform resulting in the formation of wrinkles in the foil liner, either of which may detrimentally affect the package seal. Containers with a relatively rigid structure (e.g., made of glass) do not allow for such expansion and contraction, so the only direction the pressure in the head space can go is up towards the deformable foil liner and, as a result, wrinkles and/or tears may form in the foil that create escape paths for the pressure and that detrimentally affect the seal of the package. Further, the bond between the foil liner and the sealing surface of the container can weaken, for example, if the foil liner pulls away from the container sealing surface.

Figure 1:
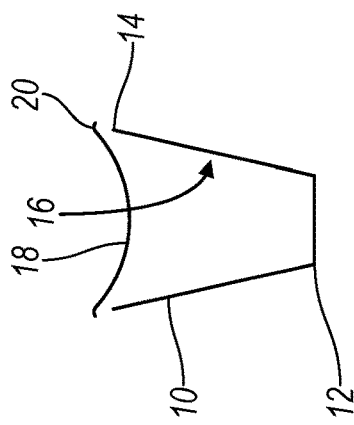
FIG. 1 is an exploded, side view of a container and a foil liner in accordance with an illustrative embodiment of the present disclosure.

FIG. 1 illustrates a container 10 that has been manufactured by any known manufacturing process, for example, press-and-blow or blow-and-blow glass manufacturing methods. Once formed, the container 10 can be filled with articles and/or products intended to be used and/or consumed. For instance, the container 10 may be used to package food products, for example and without limitation, pickles, baby food, salsa, peppers, spaghetti sauces, and jams, to cite a few possibilities. The container 10 may also be used to package products other than food products, including, but not limited to, liquids, gels, powders, particles, and the like.

The container 10 can have a base 12 and a liner sealing surface 14. An inner surface 16 of the container 10 can contact the product to be packaged in the container 10. The particular product can be "hot-filled" into the container 10 such that the product is heated and, subsequently, deposited into the container 10. After filling the container 10 with the appropriate product, a foil liner 18 can be applied to the sealing surface 14 of the container 10 in order to form a bond between the foil liner 18 and the container 10, and to isolate the packaged product from the surrounding environment and increase the longevity of the packaged product. The bond is established between the container 10 and at least a radially peripheral margin 20 of the foil liner 18.

The combination of the foil liner 18, the container 10, and the product in the container 10 can form a sealed package 60. In some cases, the hot product can heat up an interior of the sealed package 60, causing variations in the foil liner 18 itself, or the bond between the foil liner 18 and the container 10. The sealed package 60 can undergo any of the processes or steps described herein, for example, in order to minimize or eliminate possible commercial variations.

Figure 2:
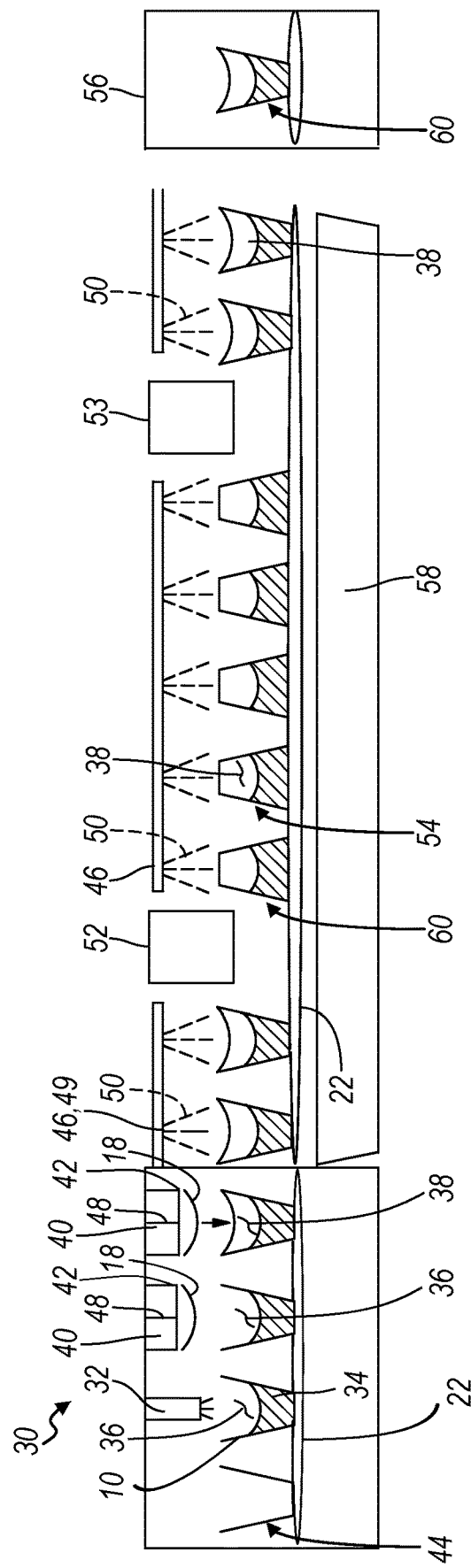
FIG. 2 depicts steps of a method of sealing the foil liner to the container of FIG. 1 to produce a sealed package in accordance with an illustrative embodiment of the present disclosure.

FIG. 2 schematically illustrates equipment 30 that may be used to carry out an illustrative method, in which the containers 10 can be hot-filled and still retain an intact foil liner 18. It will be appreciated that additional and/or alternative equipment could be used, such as additional lines, pumps, fluid sources, nozzles, conveyors, gears, pressurizers, heaters, coolers, and the like. Empty containers 10, as shown in FIG. 1, are deposited in an upright condition 44 (e.g., an upright container position, mouth and/or open end facing upward) onto a conveyor belt 22. The containers 10 are filled (e.g., hot-filled) by way of a filling apparatus 32 with a product 34. The product 34 may be hot (e.g., 82° C.-93° C.) and can heat up the interior of the container 10, including a container space 36 that is adjacent to but empty of the product 34. Containers are not typically filled completely to the sealing surface 14, but instead, the space that is allowed between the sealing surface 14 and the top surface of the product is referred to herein as the container space 36.

Once filled, the container 10 is moved along the conveyor belt 22 to a position adjacent a seal head 40. The seal head 40 has a liner engagement surface 42 that contacts the foil liner 18 to bond the foil liner 18 to the container 10. More specifically, the method may include aligning the liner engagement surface 42 of the seal head 40 with the liner sealing surface 14 of the container 10. This alignment occurs when the container 10 is in a first position 44 (e.g., an upright container position, mouth and/or open end is up), wherein at least the peripheral margin 20 of the foil liner 18 is disposed between the liner engagement and sealing surfaces 42, 14 of the seal head 40 and the container 10, respectively. The liner engagement surface 42 may be shaped (e.gs., linear, curved, convex, or concave) to correspond to the foil liner 18, the liner sealing surface 14 of the container 10, or both.

The seal head 40 can apply a force to the foil liner 18 that creates a pressure on the foil liner 18 and the container 10 to bond the foil liner 18 to the container 10, including a pressure of approximately 25 psi to 80 psi. For purposes of this disclosure, "approximately" means that a given quantity is within 10%, preferably within 5%, more preferably within 1%, of a comparison value (e.g., the pressure may be within 1% of 60 psi).

As depicted in FIG. 2, the first position 44 is an upright position of the container 10, or when the liner sealing surface 14 of the container 10 is located above the base 12 of the container 10. In the first position 44, the product 34 packaged in the container 10 contacts the inner surface 16 at the base 12 of the container 10 and does not contact the inner surface 16 at the liner sealing surface 14 of the container 10.

Once the container 10, seal head 40, and foil liner 18 are aligned, heat can be applied between the seal head 40 and the container 10, in the direction of the arrow depicted in FIG. 2, to heat and attach the foil liner 18 and the liner sealing surface 14 of the container 10 in order to form the bond between the foil liner 18 and the liner sealing surface 14 and produce a sealed package 60. The generated heat and/or the heat from the hot-filled product 34 within the sealed package 60 may cause the head space 38, to expand and/or the pressure within the sealed package 60 to increase, thereby possibly stretching the foil liner 18 causing it to tear, deform, or result in the formation of wrinkles in the foil liner 18 which may detrimentally affect the bond, or separate from the container sealing surface 14.

After sealing, the method can include separating the seal head 40 from the sealed package 60, for example, by retracting the seal head 40 away from the conveyor belt 22. After separating the seal head 40 from the sealed package 60, the seal head 40 can still be utilized to cool the sealed package 60. The seal head 40 itself can have one or more fluid paths 48 therethrough for passing a fluid 50 (e.g., air through the seal head 40 when sealing) to the sealed package 60, for example, passing the fluid 50 out of the seal head 40 and towards the foil liner 18. Additionally, and or alternatively, one or more additional nozzles 46 can apply the fluid 50 (e.g., water subsequent to sealing) through one or more fluid paths 49 in the nozzle 46. The method can include applying the fluid 50 through the one or more fluid paths 48, 49 in either of the seal head 40 or the nozzles 46, respectively, and to the foil liner 18 to cool the foil liner 18. Multiple seal heads, such as seal head 40, and/or multiple nozzles, such as nozzle 46, can be positioned at various locations throughout the equipment to deliver the fluid 50.

As depicted in FIG. 2, the seal head 40 seals the containers 10, and subsequent nozzles 46 cool the sealed package 60. Regardless of what particular component delivers the fluid 50, the fluid 50 also cools the package head space 38 between the foil liner 18, the inner surface 16 of the container 10, and the product 34 packaged in the sealed package 60. When the fluid 50 is applied, the sealed package 60 may be in the first position 44. The fluid 50 can directly contact the foil liner 18.

The fluid 50 applied to the sealed package 60 can have a cooling temperature of 1° C. to 38° C., including all ranges, subranges, and values therebetween. A cooling temperature at or above room temperature may also be used, for example. A flow rate (e.g., 0.1-1.0 gallon per minute) for applying the fluid 50 can be adjusted or constant during cooling as well.

Subsequently, a first rotator 52 can rotate the sealed package 60 from the first position 44 to a second position 54. The second position 54 can be an inverted position, in which the liner sealing surface 14 of the sealed package 60 is located below the base 12 of the container 10. In the inverted position, the product 34 packaged in the sealed package 60 contacts the inner surface 16 at the liner sealing surface 14 of the container 10 and does not contact the inner surface 16 at the base 12 of the container 10.

It will be appreciated that the first or second positions 44, 54 may not necessarily be the upright or inverted positions, respectively, but rather may be intermediate positions between the upright position and the inverted position. For example, the liner sealing surface 14 and the base 12 of the container 10 could be at an oblique angle with respect to the conveyor belt 22. Even in an intermediate position, the head space 38 still exists adjacent to a portion of the inner surface 16 of the container 10 and being devoid of the packaged product 34.

In the second position 54, the packaged product 34 still may be heated and the heat can sterilize and/or pasteurize an interior of the foil liner 18, facing the packaged product 34. The sterilization and/or pasteurization temperature can be in the range of 60° C. to 81° C. in the interior of the sealed package 60, including all ranges, subranges, and values therebetween. The hot, packaged product 34 can also be stirred or shaken during the rotating step, causing the container head space 38 to expand and/or the pressure therein to increase, thereby possibly detrimentally affecting the foil liner 18, as discussed above. Subsequently, the method can include applying the fluid 50 onto at least a portion of the sealed package 60 to cool the head space 38 of the sealed package 60 that is disposed between the inner surface 16 of the sealed package 60 and the packaged product 34. If the sealed package 60 is inverted during the rotating step, the outer surface of the container 10 that contacts the fluid 50 can be at the base 12 of the container 10. When the sealed package 60 is inverted, the air space will move to the top most portion of the sealed package 60 and therefore, the head space 38 may shift such that it is be between the packaged product 34 and the inner surface of the base 12 of the container 10.

By using the fluid 50 after the rotating step, the packaged product 34 can still sterilize and/or pasteurize the inner surface 16 and the fluid 50 can also cool the sealed package 60 sufficiently so that the bond between the foil liner 18 and the container 10, or the foil liner 18 itself, is not detrimentally affected. In this way, the sealed package 60 can be initially cooled, subsequently handled (e.g., shaken) in a way that may reheat the interior of the sealed package 60, and cooled again so that the foil liner 18 remains intact.

The steps of applying the fluid 50 can also establish a vacuum within the sealed package 60. As the head space 38 is heated, the gases therein expand and the pressure within the sealed package 60 increases. Cooling with the fluid 50 can cause the gases in the head space 38, to contract and the pressure to reduce. Cooling can also cause the packaged product and head space 38 to contract and can create an internal vacuum within the sealed package 60 when there is a proper seal. This assists in establishing the vacuum in the sealed package 60. The vacuum can help to isolate the packaged product 34 from the surrounding environment and increase its longevity.

Once the containers 10 are sufficiently cooled with the fluid 50, the method may include rotating the sealed package 60 from the second position 54 and back to the first position 44 with a second rotator 53. The first and second rotators 52, 53 can include various levers, arms, pivot points, pads, and the like to grasp and rotate the sealed package 60. The rotators 52, 53 may include, for example, a pick-and-place device, a robot, a helical chute, or any other machine or material handling equipment suitable to rotate or invert a sealed package. In some instances, rotating the sealed package 60 may include manual rotation. Just as above, the rotating step can include inverting the sealed package 60 again back to the upright position. The packaged product 34 still may be hot. In some instances, the method may next include applying the fluid 50 again to the foil liner 18 to cool the foil liner 18 and the head space 38 of the sealed package 60 between the foil liner 18 and the product 34 packaged in the sealed package 60.

In any of the above disclosed steps of applying the fluid 50, the fluid 50 can be applied for a period of 5 to 120 seconds, including all ranges, subranges, and values therebetween. The fluid 50 can also be applied in a series of fluid applying steps, wherein each step is for the period of 5 to 30 seconds, or for a total period of 5 to 30 seconds, including all ranges, subranges, and values therebetween.

The method can include disposing the sealed package 60 into a cooler 56 for storage. The cooler 56 can store the sealed package 60 at a temperature of 60° C. or less, including all ranges, subranges, and values therein. The cooler 56 can refrigerate the sealed package 60, or packages. Additionally, a tray 58 can be located adjacent to or below the sealed package 60 and can collect the fluid 50 applied to the sealed package 60 during the method. The fluid 50 can be any fluid for cooling the sealed package 60, including liquids, gases, coolant, water, cooled or compressed air, and the like, coming from any suitable source, including a gas cylinder, fluid tank, vortex tube chiller, and the like.

In each of the above steps of applying the fluid 50, it is not necessary, although possible, to apply a pressure to the foil liner 18 while it is being sprayed with the fluid 50 in order to prevent deformation associated with heating and cooling the foil liner 18. Particularly when the sealed package 60 is in the upright position, it is not necessary to also apply a pressure to the foil liner 18 during the steps of applying the fluid 50.

There thus has been disclosed a method for packaging and sealing a container to produce a sealed package, that fully satisfies one or more of the objects and aims previously set forth. The disclosure has been presented in conjunction with several illustrative aspects, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method of sealing a foil liner to a hot-filled glass container, comprising:
aligning a liner engagement surface of a seal head with a liner sealing surface of the container when the container is in an upright position, wherein the liner sealing surface of the container is located above the base of the container, and wherein at least a peripheral margin of the foil liner is disposed between the liner engagement and sealing surfaces of the seal head and the container, respectively, wherein the liner engagement surface contacts the foil liner;
applying heat between the seal head and the container to heat and attach the foil liner and the liner sealing surface of the container, which results in a sealed package;
inverting the sealed package from the upright position to an inverted position, wherein the liner sealing surface of the container is below a base of the container prior to application of fluid onto an outer surface of the base of the container; and
applying fluid onto the outer surface of the base of the container to establish a vacuum within the sealed package and to cool a head space of the sealed package that is disposed between an inner surface of the base of the container and a product packaged in the sealed package.

2. The method of claim 1, wherein following the aligning step and before the step of applying heat, the method further comprises passing the fluid through one or more fluid paths in the seal head, out of the seal head, and towards the foil liner.

3. The method of claim 1, wherein following the step of applying heat and before the step of inverting the sealed package, the method further comprises separating the seal head from the sealed package.

4. The method of claim 1, wherein following the step of applying heat and before the step of inverting the sealed package, the method comprises applying the fluid to the foil liner to cool the foil liner and the head space of the sealed package that is disposed between the foil liner and the product packaged in the sealed package.

5. The method of claim 4, wherein the step of applying the fluid to the foil liner comprises applying the fluid for a period of 5 to 30 seconds.

6. The method of claim 1, wherein following the inverting step, the method further comprises pasteurizing an interior of the foil liner with the product packaged in the sealed package.

7. The method of claim 6, wherein the pasteurizing temperature is in a range of 60° C.-81° C.

8. The method of claim 1, wherein the step of applying fluid comprises applying the fluid for a period of 5 to 120 seconds to establish a vacuum within the sealed package.

9. The method of claim 1, wherein following the step of applying fluid, the method further comprises disposing the sealed package in a cooler.

10. The method of claim 1, wherein the applying heat step further comprises forming a bond between the foil liner and the liner sealing surface.

11. The method of claim 1, wherein the seal head applies a force to the foil liner, thereby creating a pressure on the foil liner.

12. The method of claim 11, wherein the seal head applies a force to the foil liner, thereby creating a pressure of 25-80 psi on the foil liner.

13. The method of claim 1, wherein the fluid applied to the outer surface of the base of the container is at a temperature of 1° C.-38° C. and at a flow rate of 0.1-1.0 gallons per minute.

14. The method of claim 1, further comprising:
hot-filling the container with a product at a temperature of 82° C.-93° C., prior to the aligning step.

15. A method of sealing a foil liner to a hot-filled glass container, comprising:
aligning a liner engagement surface of a seal head with a liner sealing surface of the container when the container is in an upright position, wherein the liner sealing surface of the container is located above the base of the container, and wherein at least a peripheral margin of the foil liner is disposed between the liner engagement and sealing surfaces of the seal head and the container, respectively, wherein the liner engagement surface contacts the foil liner;
applying heat between the seal head and the container to heat and attach the foil liner and the liner sealing surface of the container, resulting in a sealed package;
separating the seal head from the sealed package;
applying fluid to the foil liner to cool the foil liner and a head space of the sealed package that is between the foil liner and a product packaged in the sealed package;
inverting the sealed package from the upright position to an inverted position prior to application of fluid onto an outer surface of the base of the container, wherein the inverted position comprises the liner sealing surface of the container being located below a base of the container; and
applying the fluid onto the outer surface of the base of the container to establish a vacuum within the sealed package and to cool the head space of the sealed package that is disposed between an inner surface of a base of the container and the product packaged in the sealed package.

16. The method of claim 15, wherein following the step of inverting the sealed package from the upright position to the inverted position and before the step of applying the fluid onto the base of the container to cool the head space of the container, the method further comprises pasteurizing an interior of the foil liner with the product packaged in the sealed package.

17. The method of claim 15, further comprising:
inverting the sealed package from the inverted position to the upright position; and
applying the fluid to the foil liner to cool the foil liner and the head space of the sealed package that is between the foil liner and the product packaged in the sealed package.

18. The method of claim 17, wherein the three steps of applying the fluid include applying the fluid for a period of 5 to 120 seconds, respectively.

19. The method of claim 15, wherein the applying heat step further comprises forming a bond between the foil liner and the liner sealing surface.

20. A method of cooling a hot-filled, sealed package, including a foil liner sealed to a glass container, the method comprising the steps of:
a) applying a cooling fluid to the foil liner;
b) inverting the sealed package from an upright position to an inverted position prior to applying the cooling fluid step c); and
c) applying the cooling fluid to an outer surface of a base of the container to establish a vacuum within the sealed package and cool a head space of the sealed package that is disposed between an inner surface of the base of the container and a product packaged in the sealed package.

21. The method of claim 20, further comprising:

d) refrigerating the sealed package.

22. The method of claim 20, wherein step b) inverting the sealed package includes pasteurizing an interior of the foil liner with a product packaged in the sealed package.

23. The method of claim 20, wherein the method further includes a bond between the glass container and the foil liner.

\* \* \* \* \*